(12) United States Patent
Clark

(10) Patent No.: US 7,340,781 B2
(45) Date of Patent: Mar. 11, 2008

(54) HEADWEAR

(76) Inventor: Christopher D Clark, 3219 Perch Dr., SW., Marietta, GA (US) 30008

( * ) Notice: Subject to any disclaimer, the term of this patent is extended or adjusted under 35 U.S.C. 154(b) by 0 days.

(21) Appl. No.: 11/386,358

(22) Filed: Mar. 22, 2006

(65) Prior Publication Data

US 2006/0215108 A1    Sep. 28, 2006

Related U.S. Application Data

(60) Provisional application No. 60/664,530, filed on Mar. 24, 2005.

(51) Int. Cl.
*A42B 1/24* (2006.01)
(52) U.S. Cl. .................. 2/209.13; 351/155; 359/815
(58) Field of Classification Search .............. 2/209.13, 2/425, 10; 351/155; 359/409, 815
See application file for complete search history.

(56) References Cited

U.S. PATENT DOCUMENTS

| 2,445,355 A * | 7/1948 | Hurt .................................. 2/10 |
| 3,572,931 A * | 3/1971 | Adler ............................ 356/46 |
| 4,839,926 A * | 6/1989 | Choi ................................ 2/10 |
| 5,131,093 A * | 7/1992 | Rudenschold ..................... 2/10 |
| 5,181,139 A * | 1/1993 | Benitez ....................... 359/408 |
| 5,208,916 A * | 5/1993 | Kelman ............................ 2/10 |
| 5,282,086 A | 1/1994 | Goldstein |
| 5,526,178 A | 6/1996 | Goldstein et al. |
| 5,987,640 A * | 11/1999 | Ryder .............................. 2/10 |
| 6,115,846 A | 9/2000 | Truesdale |
| 6,369,958 B1 * | 4/2002 | Himmele ..................... 359/815 |
| 6,938,273 B2 * | 9/2005 | Ko .................................. 2/10 |
| 6,959,989 B2 * | 11/2005 | Holm ......................... 351/155 |
| 2005/0039240 A1 * | 2/2005 | Kidouchim ..................... 2/10 |
| 2006/0037125 A1 * | 2/2006 | McDowell ................. 2/209.13 |

* cited by examiner

*Primary Examiner*—Katherine Moran
(74) *Attorney, Agent, or Firm*—Barnes & Thornburg LLP

(57) ABSTRACT

Headwear comprising a headband portion, a brim portion, a lens receiving portion, and a vision enhancing element operatively coupled with the lens receiving portion. The lens receiving portion and brim portion may be formed as a single-piece unitary member, such as a single piece of plastic.

10 Claims, 3 Drawing Sheets

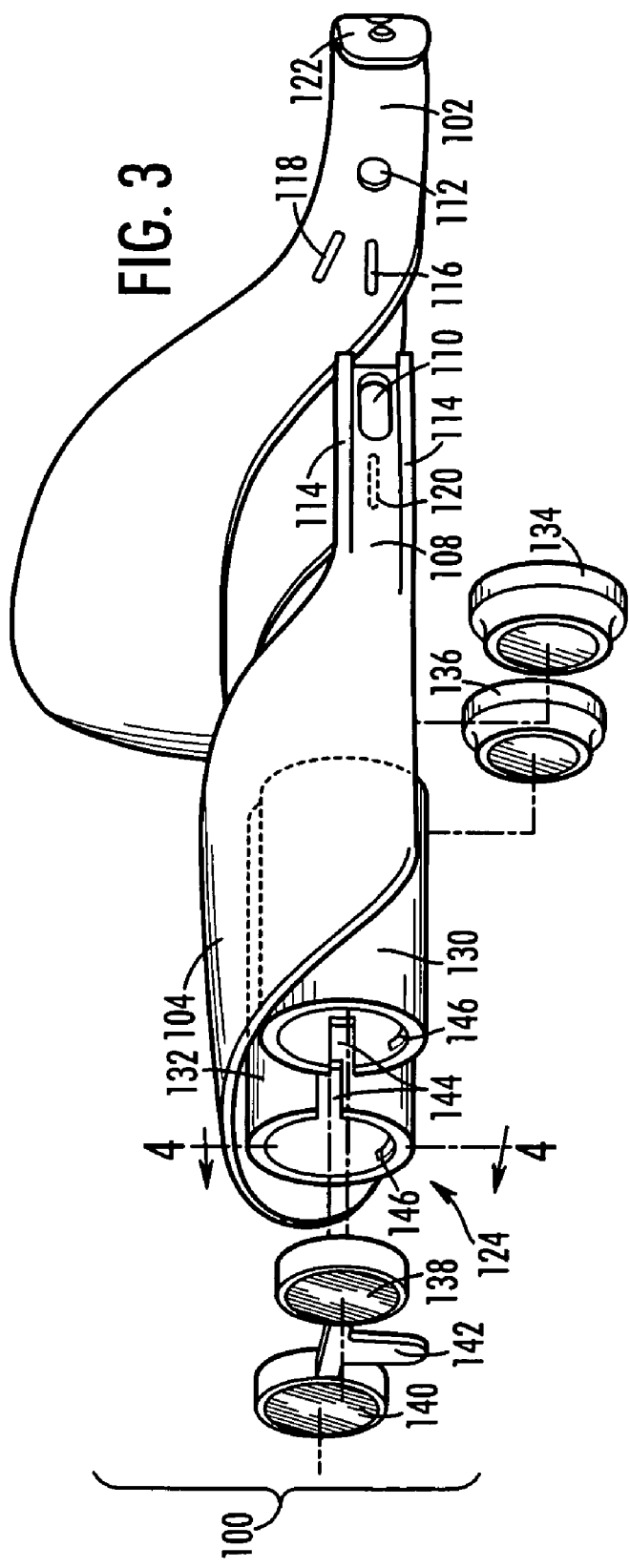
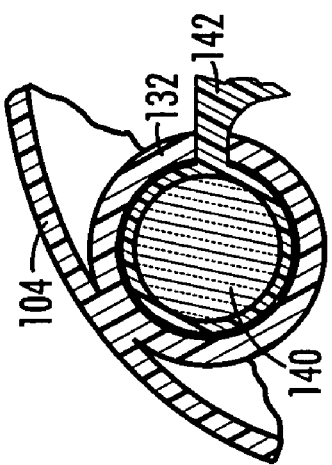
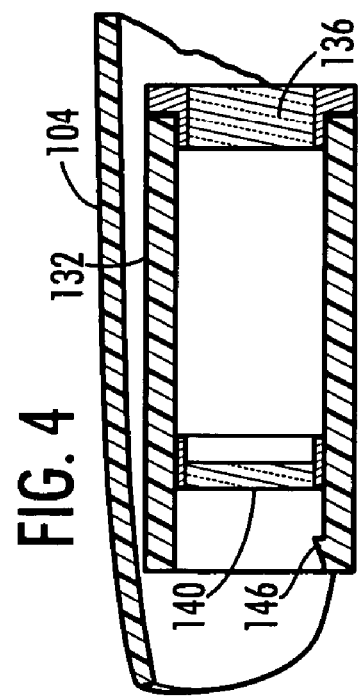

HEADWEAR

PRIORITY CLAIM

The present application claims the benefit of U.S. Provisional Patent Application, Ser. No. 60/664,530, filed on Mar. 24, 2005, which is incorporated herein by reference.

TECHNICAL FIELD

This invention relates to headwear, such as a visor or cap. In particular, this invention relates to headwear with a binocular assembly.

BACKGROUND

Binoculars are used in many different activities, such as spectator sports, concerts, and bird watching, to magnify a distant point. In sporting events held at large arenas, for example, spectators may be far away from players on the field. Accordingly, spectators often bring binoculars to more easily see the activities occurring on the field. Carrying the binoculars to the event, however, can be cumbersome and tiring. Moreover, a spectator may experience physical discomfort with the prolonged use of binoculars due to the muscular fatigue caused by raising arms his/her arms for an extended time.

Binoculars mounted to the brim of a visor or cap have been devised. However, many of these designs include unsightly and complex mechanisms for attaching the binoculars to the brim. Additionally, the weight that the binoculars add to the brim can be bulky and cumbersome to wear.

SUMMARY

A headwear in accordance with one aspect of the invention comprises a headband portion, a brim portion, a lens receiving portion and a vision enhancing element operatively coupled with the lens receiving portion. The brim portion may be proximate to the headband portion. The lens receiving portion and brim portion may be formed as a single-piece unitary member.

In some exemplary embodiments, the lens receiving portion and the brim portion are formed as a single piece of plastic. Embodiments are also contemplated in which the vision enhancing element is movable with respect to the lens receiving portion along a longitudinal axis of the lens receiving portion.

Depending on the exigencies of a particular application, the lens receiving portion may be generally cylindrical in shape. In some such embodiments, the lens receiving portion may define an elongated hole that is dimensioned to receive the vision enhancing element. Typically, the lens receiving portion may extend below the brim portion. In some embodiments, a focus adjustment member may be provided. In such embodiments, the focus adjustment member may extend through the hole in the lens receiving portion. In many cases, the focus adjustment member may be engagable to move the vision enhancing element with respect to the lens receiving portion. For example the lens receiving portion may include a longitudinally extending groove through which at least a portion of the focus adjustment member extends.

In other examples, the lens receiving portion may be a channel defined in the brim portion. For example, the channel may be dimensioned to receive at least a portion of a rim surrounding the vision enhancing element. Typically, the rim may include an extension that is received by the channel.

According to a further aspect, the invention provides headwear comprising a brim portion pivotally coupled to a headband portion. The brim may move between a lowered position and a raised position. A binocular assembly may also be provided that is disposed below the brim portion. The headwear may be configured such that the binocular assembly is axially aligned with a user's eye when the brim portion is in the lowered position, but not in the raised position.

In some examples, the binocular assembly comprises a pair of lens receiving members and a pair of magnifying lenses selectively attachable to the lens receiving members. Typically, the pair of lens receiving members and the brim portion are formed as a unitary member. For example, the pair of lens receiving members and the brim portion could be formed as a single piece of plastic.

According to a further aspect, the invention provides a method of configuring headwear. The method may include the step of providing headwear including a headband portion, a brim portion extending from the headband portion and a lens receiving portion extending from the brim portion. The method may also include the step of providing a magnifying lens. Additionally, the method may include coupling the magnifying lens with the lens receiving portion. In some examples, the method may include moving the magnifying lens with respect to the lens receiving portion, such that the lens receiving portion is stationary with respect to the brim portion.

Additional features and advantages of this invention will become apparent to those skilled in the art upon consideration of the following detailed description of the illustrated embodiment exemplifying the best mode of carrying out the invention as presently perceived.

BRIEF DESCRIPTION OF DRAWINGS

The present disclosure will be described hereafter with reference to the attached drawings which are given as non-limiting examples only, in which:

FIG. 3 is an exploded view of an example headwear resembling a visor;

FIG. 4 is a partial side cross-sectional view of the brim portion of FIG. 3 along line 4-4;

FIG. 5 is a side cross-sectional view of the example headwear shown in FIG. 1 along line 5-5;

FIG. 6 is a partial front cross-sectional view of the headwear shown in FIG. 1.

Figure 1:
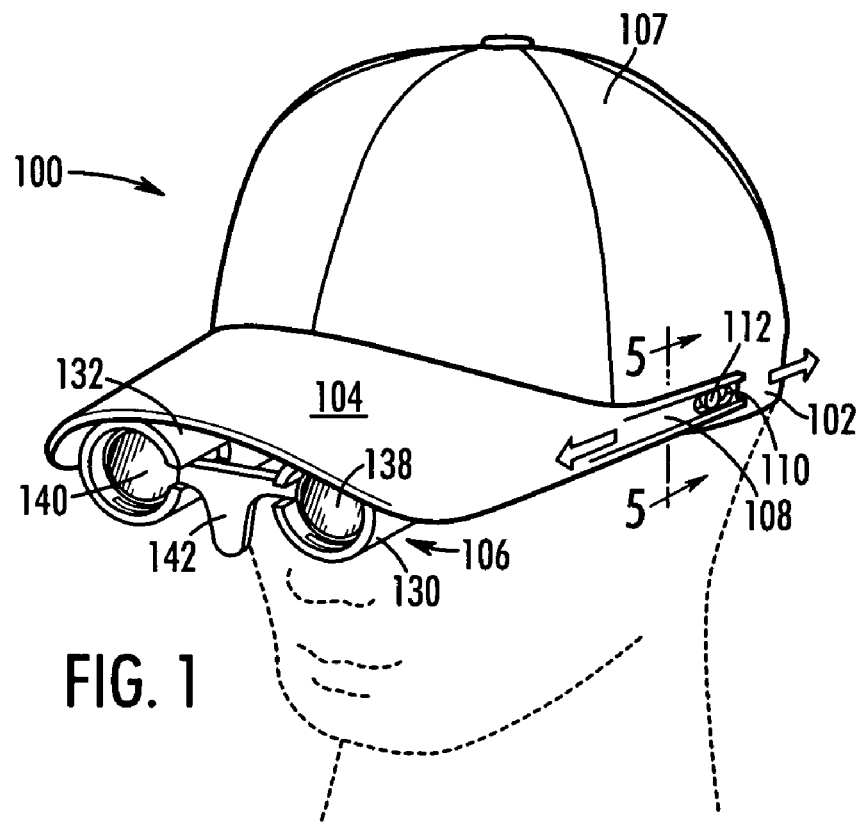
FIG. 1 is a perspective view of an example headwear resembling a baseball cap with the brim portion in the lowered position according to one aspect of the present invention.

Corresponding reference characters indicate corresponding parts throughout the several views. The components in the figures are not necessarily to scale, emphasis instead being placed upon illustrating the principles of the invention. The exemplification set out herein illustrates embodiments of the invention, and such exemplification is not to be construed as limiting the scope of the invention in any manner.

DETAILED DESCRIPTION OF THE DRAWINGS

Figure 2:
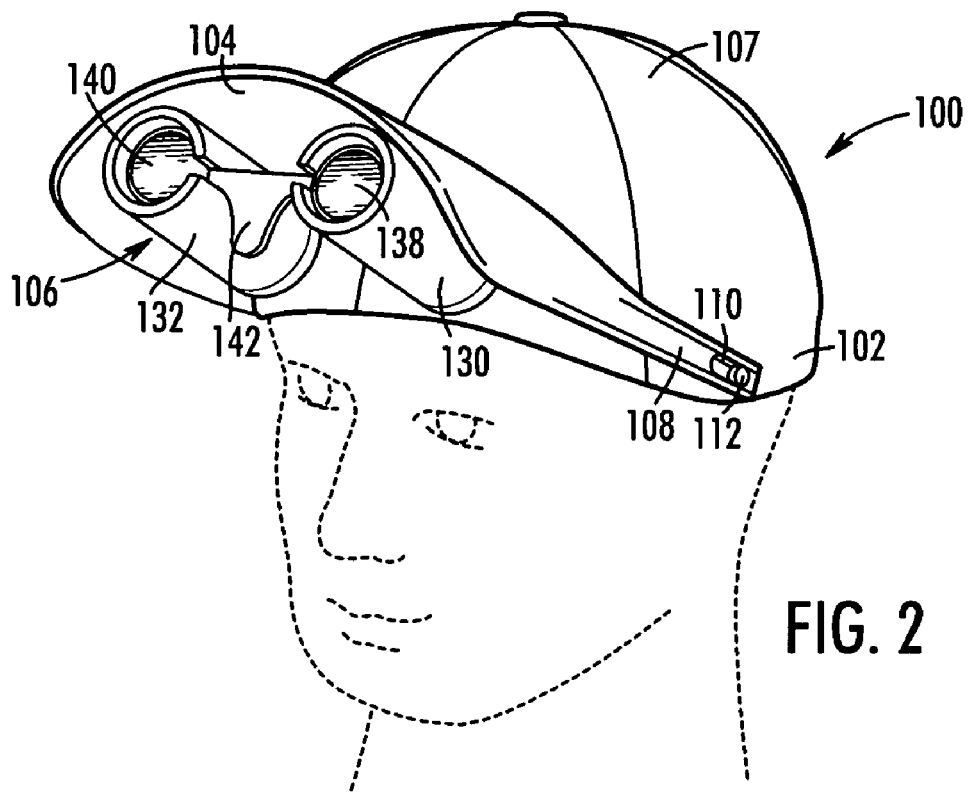
FIG. 2 is the example headwear of FIG. 1 with the brim portion in the raised position.

FIGS. 1 and 2 show a user wearing a headwear 100. Although the example headwear 100 shown in FIGS. 1 and 2 resembles a baseball cap, it should be appreciated that headwear 100 may resemble other types of hats, helmets, or other head coverings. Embodiments are also contemplated in which headwear 100 may not include a portion that covers the user's head. For example, headwear 100 may resemble a visor (as seen in FIG. 3).

In the example shown, headwear 100 comprises a headband portion 102, a brim portion 104 and a binocular assembly 106. Headband portion 102 encircles the head of the user. Optionally, a crown portion 107 may be integrally formed with and/or attached to headband portion 102 to cover the user's head. In some embodiments, headband portion 102 may be formed entirely from plastic. Embodiments are also contemplated in which headband portion 102 may be formed from other materials, such as fabric, elastic material, or leather. It should be appreciated that headband portion 102 may be formed from a combination of plastic, fabric, elastic material, leather, or other materials.

Brim portion 104 extends from headband portion 102 to shade the user's eyes and/or face. Brim portion 104 may be formed from various materials, such as plastic, fabric, leather, or a combination of materials. Any materials that may be used for the brim of a cap or visor may be suitable for brim portion 104. As discussed below, at least a portion of binocular assembly 106 may be formed as a unitary member with brim portion 104. Preferably, binocular assembly 106 magnifies a distant point when axially aligned with the user's eyes. However, the term "binocular assembly" is not intended to be limited to magnification, but refers to a vision enhancement for the user. For example, binocular assembly 106 may be configured for night vision, virtual reality, optical filtration, or sunglasses. In the example shown, binocular assembly 106 extends below brim portion 104.

In some embodiments, brim portion 104 may be pivotally coupled to headband portion 102, which allows brim portion 104 to move between a lowered position (FIG. 1) and a raised position (FIG. 2). In the lowered position, binocular assembly 106 is axially aligned with the user's eyes to provide a visual enhancement, such as magnifying player(s) on a sporting field. In the raised position, binocular assembly 106 is not axially aligned with the user's eyes. For example, the user may move brim portion 104 to the raised position when looking at a person seated next to the user.

In the example shown, brim portion 104 includes a brim extension 108 with a pivot hole 110 that is dimensioned to receive a knob 112 on headband portion 102. Although this pivotal connection is shown for purposes of example, it should be appreciated that other suitable pivotal connections may be used. For example, a rivet joint between brim extension 108 and headband portion 102 may provide a pivotal connection.

Embodiments are also contemplated without a pivotal connection between brim portion 104 and headband portion 102. For example, brim portion 104 and headband portion 102 may be fixedly attached or formed as a unitary member. In such an embodiment, the user would remove headwear 100 when binocular assembly 106 is not desired.

In the example shown, brim portion 104 is linearly movable with respect to headband portion 102 (as indicated by arrows in FIG. 1), which allows binocular assembly 106 to be moved closer to or further away from the user's eyes. In an embodiment where binocular assembly 106 moves concomitant with movement of brim portion 104, for example, the user's linear movement of brim portion 104 with respect to headband portion 102 also adjusts the distance between binocular assembly 106 and the user's eyes. Although many suitable arrangements could be used for such a linear adjustment, the example shown provides an elongated pivot hole 110 that allows limited linear movement of knob 112. Optionally, rails 114 may be formed on brim extension 108 to aid in guiding linear movement of knob 112 (as best seen in FIG. 3).

FIG. 3 shows an exploded view of an example headwear 100. In this example, headwear 100 resembles a visor. Headwear 100 may include a locking mechanism that selectively fixes the angular position of brim portion 104 with respect to headband portion 102. For example, the locking mechanism could be used to selectively position brim portion 104 in either the lowered position (FIG. 1) or raised position (FIG. 2). In the example shown, headband portion 102 includes a lower groove 116 and an upper grove 118 which each are dimensioned to receive a ridge 120 protruding from inner surface of brim extension 108 (as best seen in FIG. 5). Lower groove 116 and upper groove 118 are positioned on headband portion 102 to correspond with lowered and raised position of brim portion 104, respectively. Lower groove 116 receives ridge 120 when brim portion 104 is in the lowered position while upper groove 118 receives ridge 120 when brim portion 104 is in the upper position. It should be appreciated that other suitable locking mechanisms for selectively fixing the angular position of brim portion 104 with respect to headband portion 102 could be used. For example, friction between a portion of brim portion 104 and headband portion 102 may allow a user to select an angular position between brim portion 104 and headband portion 102. Embodiments are also contemplated in which hook and loop fasteners may be used as a locking mechanism.

Headband portion 102 may include an adjustable member 122 to vary the diameter of headband portion 102, which allows headband portion 102 to accommodate various sizes of heads. Although an interlocking structure is shown for purposes of example, other headband adjustments could be used, such as hook and loop fasteners or buckle and straps. Other embodiments are contemplated in which at least a portion of headband portion 102 may include an elastic material to vary the diameter of headband portion 102.

In the example shown, binocular assembly 106 comprises a lens receiving portion 124 that is configured to receive a vision enhancing element, such as a magnifying lens. In some embodiments, lens receiving portion 124 may include a left lens receiving member 130 and/or a right lens receiving member 132. Each lens receiving member 130, 132 may include an elongated hole dimensioned to receive at least one magnifying lens. Lens receiving members 130, 132 are cylindrical in the examples shown in FIGS. 1, 2, 3, 4, and 6. It should be appreciated, however, that lens receiving members 130, 132 could have a triangular, square, rectangular, oval or other cross-sectional shape. Embodiments are also contemplated in which a separate lens receiving member could be provided for each magnifying lens. For example, lens receiving portion 124 may include four lens receiving members in an embodiment with four magnifying lenses. By way of another example, lens receiving portion 124 may include a single lens receiving member in an embodiment with a single magnifying lens. Lens receiving members 130, 132 may be positioned below brim portion 104 so as to be axially aligned with the user's eyes. For example, left lens receiving member 130 may be axially aligned with the user's left eye while right lens receiving member 132 may be axially aligned with the user's right eye.

Binocular assembly 106 may include a left eye lens 134 and right eye lens 136. A left objective lens 138 and right objective lens 140 may also be included in binocular assembly 106. In the example shown, left and right eye lenses 134, 136 are received in the proximate end of left and right lens receiving members 130, 132, respectively. In some examples, eye lenses 134, 136 may be attached to lens receiving members 130, 132 using a fictional fit, threaded fit, interference fit or other connection. This example also shows left and right objective lenses 138, 140 received in the distal end of left and right receiving members 130, 132, respectively. Accordingly, in this example, left eye lens 134 is axially aligned with left objective lens 138, while right eye lens 136 is axially aligned with right objective lens 140. Embodiments are contemplated in which binocular assembly 106 may be assembled by inserting eye lenses 134, 136 into the proximate end of lens receiving members 130, 132 and objective lenses 138, 140 into distal end of lens receiving members 130, 132. It should be appreciated that eye lenses 134, 136 and/or objective lenses 138, 140 could each be formed as a single lens. For example, a single eye lens dimensioned to be axially aligned with the user's left and right eyes could be used instead of separate eye lenses for the user's left and right eyes. Likewise, a single objective lens dimensioned to be axially aligned with the user's left and right eyes could be used instead of separate objective lenses for the user's left and right eyes. Embodiments are also contemplated in which additional magnifying lenses may be included in binocular assembly 106. For example, additional magnifying lenses may be provided to adjust magnification of a distant point.

Objective lenses 138, 140 may be movable with respect to eye lenses 134, 136 for purposes of focusing (as best seen in FIG. 4). In the example shown in FIGS. 1, 2, 3, and 6, a focus adjustment member 142 is connected to objective lenses 138, 140. Focus adjustment member 142 provides an engagement surface for a user to move objective lenses 138, 140 with respect to eye lenses 134, 136. To accommodate focus adjustment member 142, lens receiving members 130, 132 may include a longitudinal groove 144 through which focus adjustment member 142 extends. A stop 146 may be formed on an interior surface of lens receiving members 130, 132 near the distal end of lens receiving members 130, 132. Stop 146 could be used to prevent removal of objective lenses 138, 140 from lens receiving members 130, 132. In the example shown, stop 146 is sloped to allow insertion of objective lenses 138, 140 into lens receiving members 103, 132.

Lens receiving portion 124 and brim portion 104 may be formed as an unitary member. FIG. 6 shows an example in which right lens receiving member 132 and brim portion 104 are formed as a unitary member. This type of unitary construction may reduce manufacturing costs and/or reduce the weight of binocular assembly 106. For example, embodiments are contemplated in which lens receiving portion 124 and brim portion 104 are formed as a single piece of plastic.

Figure 7:
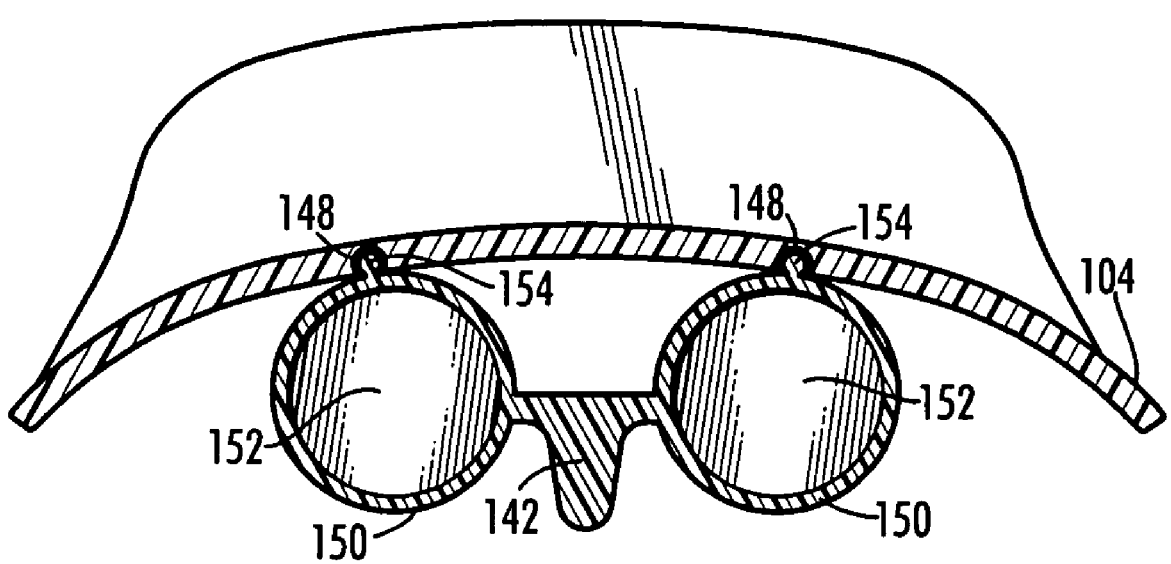
FIG. 7 is a front cross-sectional view of the headwear according to an alternative embodiment of the present invention.

FIG. 7 shows an alternative embodiment of lens receiving portion 124 and brim portion 104. In this example, lens receiving portion 124 comprises channels 148 defined in bottom of brim portion 104. A rim 150 surrounding magnifying lenses 152 includes an extension 154 that is received by a channel 148. Embodiments are contemplated in which a channel 148 may be formed for each magnifying lens.

Although the present disclosure has been described with reference to particular means, materials, and embodiments from the foregoing description, one skilled in the art can easily ascertain the essential characteristics of the present disclosure and various changes and modifications may be made to adapt the various uses and characteristics without departing from the spirit and scope of the present invention as set forth in the following claims.

What is claimed is:

1. Headwear comprising:
a headband portion;
a brim portion extending from said headband portion;
a pair of lens receiving members formed as a single-piece unitary member with said brim portion and disposed below said brim portion;
magnifying lenses coupled to said pair of lens receiving members;
wherein said brim portion is pivotally coupled to said headband portion, said brim capable of pivoting between a lowered position and a raised position; and
wherein said brim portion is linearly movable with respect to said headband portion.

2. The headwear as recited in claim 1, wherein said pair of lens receiving members are substantially cylindrical in shape.

3. The headwear as recited in claim 2, wherein said pair of cylindrical lens receiving members and said brim portion are formed as a single piece of plastic.

4. Headwear comprising:
a headband portion;
a brim portion proximate to said headband portion;
a lens receiving portion formed as a single-piece unitary member with said brim portion; and
a vision enhancing element configured to be operatively coupled with said lens receiving portion;
wherein said vision enhancing element is connected to a focus adjustment member that is capable of moving said vision enhancing element with respect to said lens receiving portion; and
wherein said focus adjustment member is linearly movable with respect to said lens receiving portion along a longitudinal axis of said lens receiving portion.

5. The headwear as recited in claim 4, wherein said lens receiving portion and said brim portion are formed as a single piece of plastic.

6. The headwear as recited in claim 4, wherein said vision enhancing element is at least one magnifying lens.

7. The headwear as recited in claim 4, wherein said lens receiving portion is generally cylindrical in shape.

8. The headwear as recited in claim 4, wherein said lens receiving portion defines an elongated hole that is dimensioned to receive said vision enhancing element.

9. The headwear as recited in claim 4, wherein said lens receiving portion extends below said brim portion.

10. The headwear of claim 4, wherein said brim portion has a substantially uninterrupted surface contour.

* * * * *